Figure 1A:
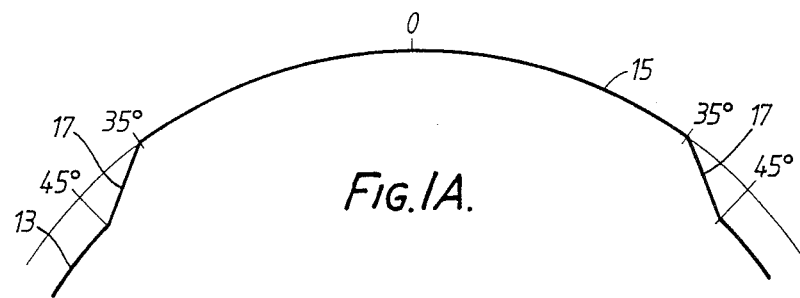

United States Patent [19]

Rhodes et al.

[11] Patent Number: 4,809,591
[45] Date of Patent: Mar. 7, 1989

[54] PISTONS WITH OIL RETAINING DEPRESSIONS

[75] Inventors: Michael L. P. Rhodes; David A. Parker, both of Rugby, Great Britain

[73] Assignee: AE PLC, Warwickshire, England

[21] Appl. No.: 169,837

[22] Filed: Mar. 18, 1988

Related U.S. Application Data

[63] Continuation of Ser. No. 902,453, filed as PCT GB83/00551 on Dec. 5, 1985, published as WO86/03815 on Jul. 3, 1986, abandoned.

[30] Foreign Application Priority Data

Dec. 15, 1984 [GB] United Kingdom ............... 8431725

[51] Int. Cl.⁴ .................................. F01B 31/10
[52] U.S. Cl. ........................... 92/159; 92/208; 123/193 P
[58] Field of Search ............... 92/153, 157, 158, 159, 92/208, 209; 123/193 P

[56] References Cited

U.S. PATENT DOCUMENTS

| | | | |
|---|---|---|---|
| 1,462,501 | 7/1923 | Barwald | 123/193 P |
| 1,760,122 | 5/1930 | Drevitson | 92/158 |
| 2,407,440 | 9/1946 | Osborne | 92/159 |
| 4,535,682 | 8/1985 | Collyear et al. | 92/158 X |
| 4,599,935 | 7/1986 | Ellermann et al. | 92/159 |

FOREIGN PATENT DOCUMENTS

| | | |
|---|---|---|
| 0141071 | 5/1985 | European Pat. Off. . |
| 2446870 | 4/1976 | Fed. Rep. of Germany . |
| 58-170840 | 10/1983 | Japan . |
| 59-203852 | 4/1985 | Japan . |
| 316044 | 9/1928 | United Kingdom . |
| 364787 | 1/1932 | United Kingdom ............. 92/158 |
| 365490 | 1/1932 | United Kingdom . |
| 582465 | 11/1946 | United Kingdom ............. 92/208 |
| 615247 | 7/1949 | United Kingdom . |
| 947060 | 4/1960 | United Kingdom . |
| 14941590 | 4/1976 | United Kingdom . |

Primary Examiner—Robert E. Garrett
Assistant Examiner—Mark A. Williamson
Attorney, Agent, or Firm—Leydig, Voit & Mayer

[57] ABSTRACT

A piston generates reduced noise in operation by the provision on its lateral bearing surfaces of two or more depressions in which oil is stored to provide a cushion against lateral movement of the piston at points of a reciprocation of the cycle where noise is generated. The depressions have a maximum depth of only 125 microns below the surrounding bearing surfaces formed on the piston. The depressions have circumferentially extending edges which are formed with steps connecting the depressions to the surrounding bearing surface.

8 Claims, 4 Drawing Sheets

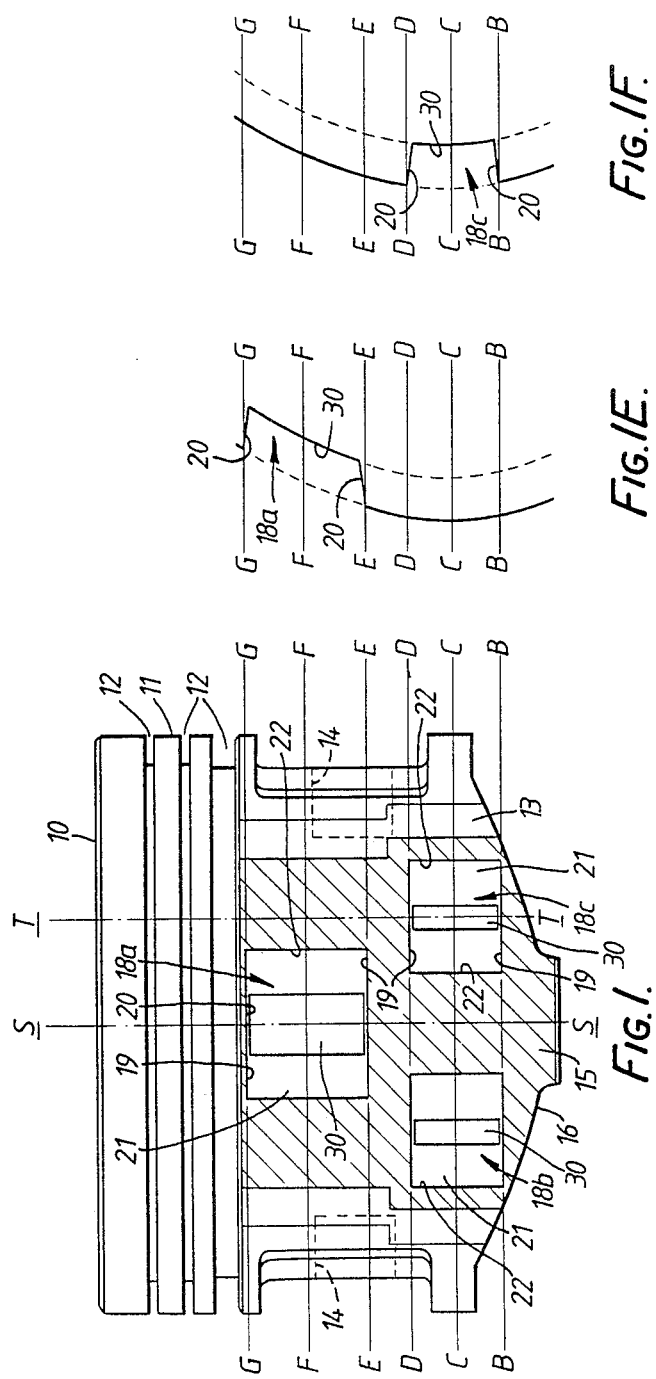

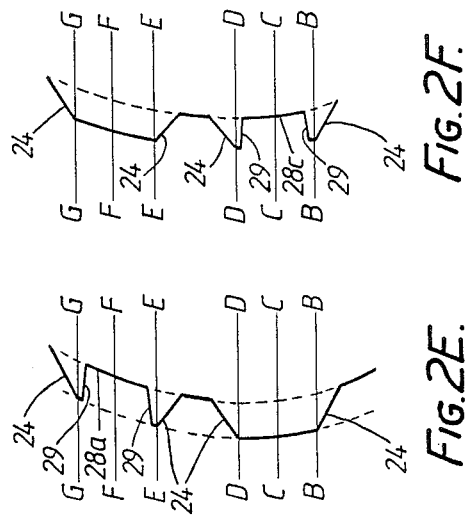
FIG.2E.
FIG.2F.
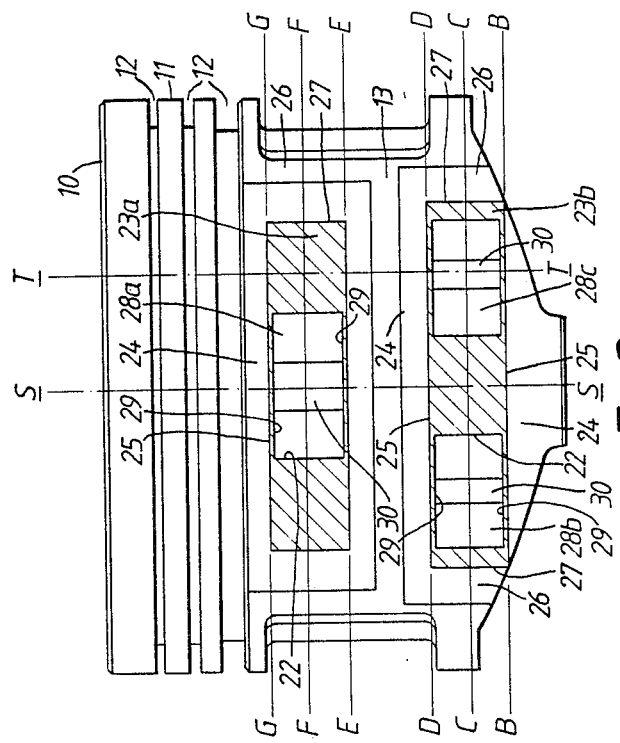
FIG.2.

PISTONS WITH OIL RETAINING DEPRESSIONS

This is a continuation of application Ser. No. 902,453, filed as PCT GB85/00551 on Dec. 5, 1985, published as WO86/03815 on Jul. 3, 1986, now abandoned.

The invention relates to pistons for internal combustion engines or compressors of the kind comprising a crown and a gudgeon pin bore, there being, on each side of a plane including the piston axis and the gudgeon pin bore axis, a bearing surface for transmitting lateral thrust to an associated cylinder or liner during reciprocation of the piston.

As a piston reciprocates within an associated cylinder or liner of an engine or compressor, noise is generated by contact between these parts. A substantial proportion of this noise is caused by lateral movement of the piston against the associated cylinder or liner, so called "piston slap", which occurs particularly when the engine or compressor is under load and when the piston is at top and bottom dead center. This has been extensively measured and analyzed, see, for example, the article by Ungar and Ross entitled "Vibrations and Noise due to Piston Slap on Reciprocating Machinery" on pages 132 to 146 of the Journal of Sound Vibration (1965) 2(2).

This noise is disadvantageous because it implies the presence of metal to metal contact between the piston and the cylinder liner, which can cause wear and because high levels of noise are undesirable. In addition, vibrations can be created which, in engines using wet cylinder liners, can cause cavitation erosion which is also undesirable. This is discussed in an article by Fearson entitled "Waterside Attach of Diesel Engine Cylinder Liners" in the Jan. 1964 issue of the Journal of the Royal Naval Shipbuilding Society.

The solution offered in the Fearson article is the creation of a full belt of oil between the piston skirt and the associated liner to provide viscous damping of the transverse motion of the piston. This is achieved by providing two taper-faced sealing rings, one towards the lower edge of the skirt and the other just below the ring band. This measure has been found, by practical experiment, to reduce cylinder liner vibration and hence noise and liner cavitation.

Although this arrangement succeeds in reducing piston slap, it has been found to have other, non-beneficial consequences. First, the quantity of oil held between the rings is of comparatively high pressure and, since the rings are always in contact with the associated cylinder or liner, there is never any release of this pressure. This can cause the oil pressure to increase to such an extent that the oil is forced past the upper ring, past the conventional compression and oil scraper rings and into the combustion chamber. This increases oil consumption and increases exhaust emissions.

Secondly, by creating a full belt of oil all round the piston, the viscous shear forces are increased between the piston and the associated cylinder or liner. This reduces the engine power and so increases fuel consumption.

For these reasons, this means of reducing piston slap has not found wide application, although the requirement for a way of reducing it, remains.

According to the invention there is provided a piston for an internal combustion engine or a compressor of the kind comprising a crown and a gudgeon pin bore, there being, on each side of a plane including the piston axis and the gudgeon pin bore axis, a bearing surface for transmitting lateral thrust to an associated cylinder or liner during reciprocation of the piston, characterized in that the bearing surface is provided with at least one oil-retaining depression, having axially spaced circumferentially extending edges, with a step being formed at each edge between the at least one depression and the adjacent bearing surface, so that the depression holds lubricating oil for damping lateral movement of the piston during reciprocation.

Figure 1B:
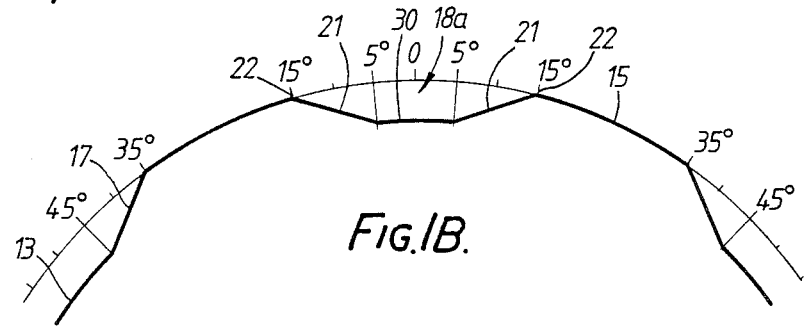
Figure 1C:
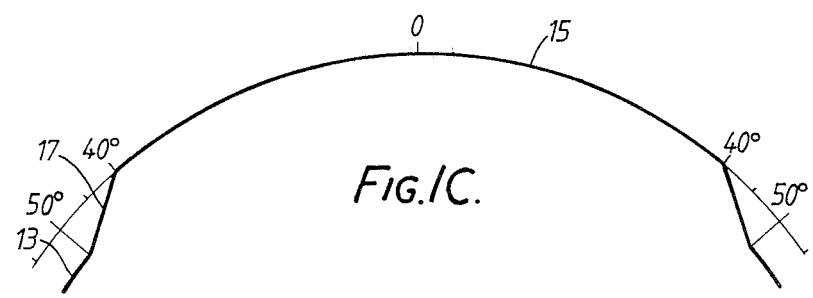
Figure 1D:
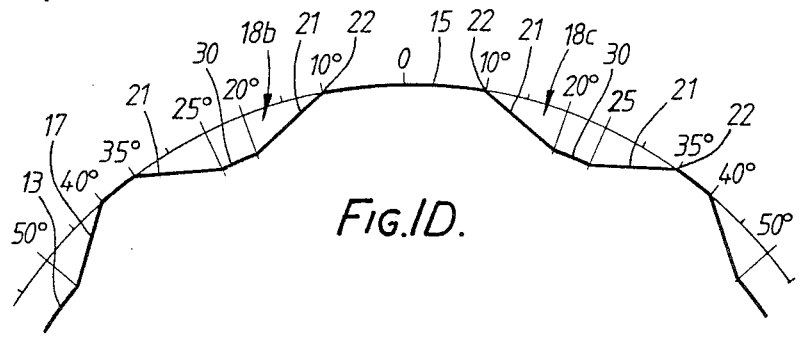
Figure 2A:
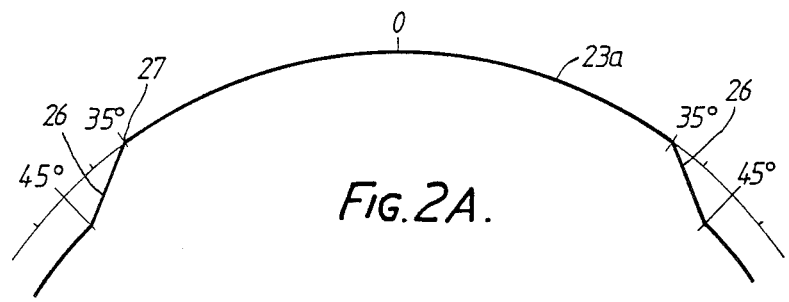
Figure 2B:
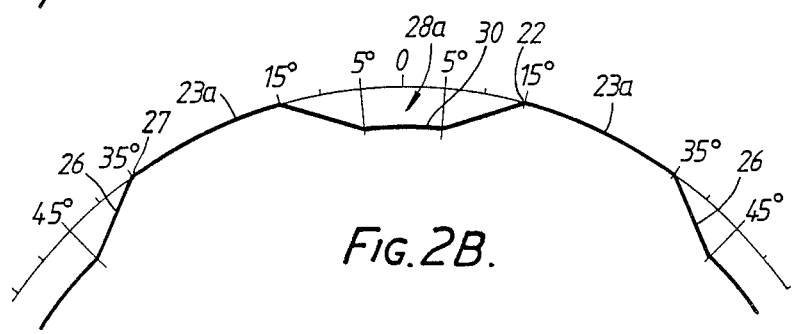
Figure 2C:
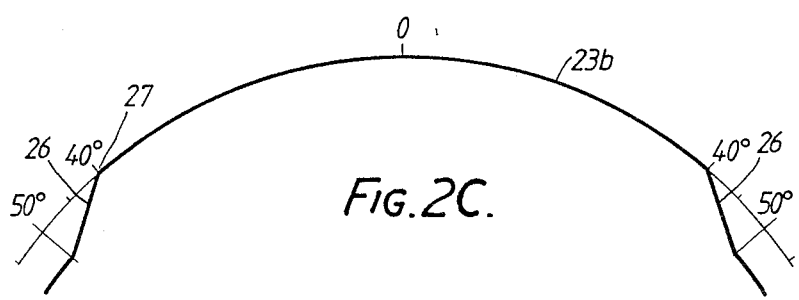
Figure 2D:
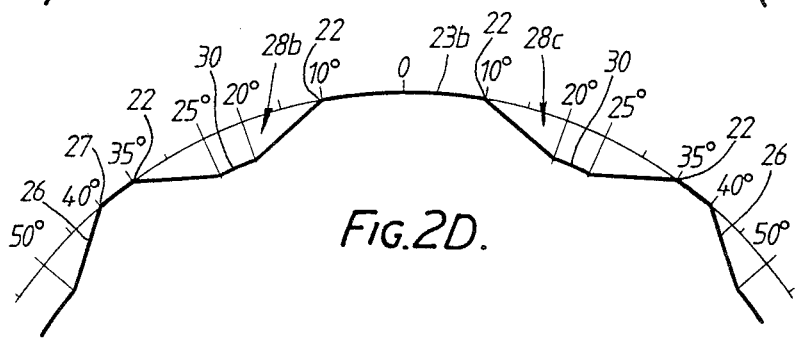

The following is a more detailed description of three embodiments of the invention, by way of example, reference being made to the accompanying drawings in which:

FIG. 1 is a side elevation of a first form of piston for an internal combustion engine or a compressor and including a bearing surface formed with a plurality of oil-retaining depressions, FIG. 1A is a polar section of a part of the bearing surface of the piston of FIG. 1 on the lines G—G and E—E of FIG. 1, FIG. 1B is a polar section of a part of the bearing surface of the piston of FIG. 1 on the line F—F of FIG. 1, FIG. 1C is a polar section of a part of the bearing surface of the piston of FIG. 1 on the lines D—D and B—B of FIG. 1, FIG. 1D is a polar section of a part of the bearing surface of the piston of FIG. 1 on the line C—C of FIG. 1, FIG. 1E is a vertical section of a part of the bearing surface of the piston of FIG. 1 on the line S—S of FIG. 1, and to a greatly exaggerated radial scale, the FIG. 1 section lines being included in this Figure, FIG. 1F is a vertical section of a part of the bearing surface of the piston of FIG. 1 on the line T—T of FIG. 1, to a greatly exaggerated radial scale, the FIG. 1 section lines being included in this Figure, FIG. 2 is a side elevation of a second form of piston for an internal combustion engine having a plurality of discrete bearing surfaces, each bearing surface being formed with one or more oil-retaining depressions, FIG. 2A is a polar section of a part of the bearing surfaces of the piston of FIG. 2 on the lines G—G and E—E of FIG. 2, FIG. 2B is a polar section of a part of the bearing surfaces of the piston of FIG. 2 on the line F—F of FIG. 2, FIG. 2C is a polar section of the surface on the lines D—D and B—B of FIG. 2, FIG. 2D is a polar section of a part of the bearing surfaces of the piston of FIG. 2 on the line C—C of FIG. 2, FIG. 2E is a vertical section of a part of the bearing surfaces of the piston of FIG. 2 along the line S—S of FIG. 2, to a greatly exaggerated radial scale, and including the section lines of FIG. 2, and FIG. 2F is a vertical section of a part of the bearing surfaces of the piston of FIG. 2 on the line T—T of FIG. 2, to a greatly exaggerated radial section, and including the section lines of FIG. 2.

In all the embodiments to be described with reference to the accompanying drawings, the piston is a piston of aluminium or aluminium alloy for an internal combustion engine. The piston may be produced by casting, preferably by squeeze casting although it may also be forged. The piston is formed with a crown 10, a surrounding ring band 11 including three grooves 12 for the receipt of compression and oil control piston rings, and a skirt 13 to each side of a plane including the piston axis and the axis of a gudgeon pin bore 14.

On each side of a plane including the piston axis and the gudgeon pin bore axis, the piston skirts 13 are formed with thrust surfaces formed as one or more areas in a configuration to be described in more detail below in relation to the individual embodiments. These surfaces transmit lateral thrust from the connecting rod to the associated cylinder or liner (not shown).

Referring now to the embodiments specifically, in FIG. 1, each thrust surface 15 is formed by a single area on each skirt extending, in an axial direction, between the ring band 11 and a lower edge 16 of the skirt. At its lateral edges the thrust surface 15 is connected to the surrounding skirt by ramps 17 (see both FIG. 1 and FIGS. 1A, 1B, 1C and 1D).

Three depressions 18a, 18b, 18c are formed on the bearing surface 15. They are arranged in two axially spaced rows; an upper row and a lower row. The upper row includes only one depression 18a which is arranged about the intersection with the bearing surface 15, of a plane including the piston axis and normal to the gudgeon pin bore axis (see FIG. 1B). The lower row includes two depressions 18b, 18c (see FIG. 1 and FIG. 1D), which are equally spaced on opposite sides of said plane, with the center of each depression being angularly offset around the piston by 22.5° from this plane (see FIG. 1D). There is thus substantially no axial overlap between the upper depression 18a and the two lower depressions 18b, 18c. The upper depression 18a is of greater area than either of the two lower depressions 18b, which latter have the same area. Each depression 18a, 18b, 18c is wholly surrounded by the bearing surface 15.

As will be seen in FIGS. 1E and 1F, the skirt 13 is generally barrelled in an axial direction.

Each depression 18 is generally rectangular with two spaced circumferentially extending edges 19. As seen in FIGS. 1E and 1F, a step 20 is formed at each edge 19 between a depression 18 and the surrounding bearing surface 15. The depth of this step is preferably less than 125 microns and preferably more than 12 microns.

Each step 20 may lie in a plane normal to the piston axis or maybe inclined relative to such a plane (as seen in FIGS. 1E and 1F).

In the center of each depression 18 is a base 30 connected to axially extending side edges 22 of the depression by ramps 21 (see FIGS. 2B and 2E). The angular extent of the base 30 is preferably 5° with the angular extent of each ramp 21 being 10°. The slope of each ramp 21 is less than 1.5°.

In use, on reciprocation of the piston of FIG. 1 in a cylinder or liner of an internal combustion engine or a compressor, oil from the oil film provided on the cylinder or liner flows over the bearing surface 15 and into the depressions, where it is held by the scraping action of the edges 19 of the depressions 18. Because there is an oil film on the bearing surface, the depressions 18 will not be filled to their edges; there will be oil above the edges.

At points such as top and bottom dead center, where there is a tendency for the piston to generate noise by sideways piston slap against the associated cylinder or liner, the depressions 18 provide a cushion of oil which resists these sideways movements, and so reduces the amount of noise generated.

The fact that the depressions are angularly staggered ensures that there is a sufficient supply of oil to the depressions at all times. The use of three depressions on each side of the piston in a generally triangular configuration provides three spaced oil cushions, which thus ensure that the piston is not pivoted by the effect of the cushions during lateral movement of the piston.

As the piston reciprocates, it pivots about the gudgeon pin, so that the piston does not have a fixed spatial orientation relative to the cylinder or liner. As a result of this, there can be no build-up of oil pressure on the depressions during successive strokes of the piston, because the change of orientation releases oil from the depressions. In addition, the ramps 21 leading to the side edges 22 of the depressions 18 also allow a controlled escape of oil should the pressure of oil within a depression rise unduly. This will also have the benefit of producing an additional supply of oil over the bearing surfaces 15, so tending to ensure that these surfaces are adequately lubricated at all times.

Further, since the depressions cover only a proportion of the thrust surface of the piston, they do not produce a substantial increase in the viscous shear forces between the piston and the cylinder liner. This is also helped by the fact that, in each direction of reciprocation, there is only one side of the piston in lubricated sliding contact with the cylinder or liner. Thus, the reduction of piston slap is achieved without a substantial decrease of power or increase in fuel consumption.

Pistons of the kind described above with reference to FIG. 1 have been tested in a 2.0 liter gasoline engine. The test was performed with the engine running at 1600 r.p.m and one-third load one minute after a cold start. Measured were the level ($L_1$) of the short duration (3 ms) noise due to piston slap (i.e. the average level of filtered radiated noise over a 3 ms interval beginning at the start of the piston slap pulse. Also measured was the level ($L_2$) of noise (excluding piston slap) from other sources within the frequency band used in measuring $L_1$. The difference between $L_1$ and $L_2$ provides a measure of the intrusiveness of the piston slap noise.

For the piston of FIG. 1, fitted at a clearance of 41 mm and tested as described above, $L_1=68$ dB and $L_2=76$ dB.

The pistons fitted as original equipment in the engine (which did not have the features described above with reference to the drawings) were measured as $L_1=68$ dB and $L_2=86$ dB. Thus the "intrusiveness" of the piston slap ($L_2-L_1$), is 10 dB (86 dB$-$76 dB) less with the pistons of FIG. 1, as compared with the original equipment pistons.

Referring now to FIGS. 2 and 2A to 2F, the second piston has bearing surfaces on either side of the plane including the piston axis and the gudgeon pin bore axis, which are formed by two discrete bearing areas 23a, 23b. The discrete areas 23a, 23b are of generally elongate rectangular shape extending circumferentially around the piston and are symmetrically arranged about the intersection with the skirt surface of a plane including the piston axis and normal to the gudgeon pin bore axis. The two discrete areas 23a, 23b are axially spaced.

A ramp 24 extends up to each circumferential edge 25 of each area 23a, 23b (see FIG. 2 and FIGS. 2E and 2F) and a ramp 26 also extends up to each axially extending side edge 27 of each area (see FIG. 2 and FIGS. 2A to 2D). The radial distance between each bearing area 23a, 23b and the edges of the associated ramps remote from said area, is preferably less than 125 microns. This distance is preferably more than 12 microns. The ramp angle is less than 1.5°. This is in accordance with the teaching of our U.K.Patent Specification No. 2104188.

The areas 23a, 23b are provided with depressions 28a, 28b, 28c in the same configuration and with the same dimensions and arrangement as the depressions 18a, 18b, 18c of FIG. 1 and 1A to F and so these will not be described in detail. The provision of these depressions 28a, 28b, 28c effectively divides the upper area 23a into two circumferentially spaced surfaces disposed on either side of the plane including the piston axis and normal to the gudgeon pin bore axis (see FIG. 2B). The lower area 23b is effectively restricted to a single central portion arranged symmetrically about this plane (see FIG. 2D).

In use, the ramps 24 up to the circumferential edges of the discrete areas 23a, 23b form converging passages which direct oil over these areas to ensure hydrodynamic lubrication under the increased pressures caused by the reduction of the skirt area resulting from the use of these areas 23a, 23b. The ramps 24 also direct lubricant into the depressions 28a where lubricant is retained by the steps 20 at the circumferential edges 29 of these depressions. The function of these ramps 24 in relation to the areas 23a, 23b is more fully described in our U.K. Patent Specification No. 2104188.

As more fully described above in relation to the embodiment of FIG. 1, the presence of the oil in the depressions 28a, 28b, 28c provides a cushioning effect against lateral movement of the piston which reduces the noise levels generated by the piston, while providing adequate hydrodynamic lubrication over the bearing areas.

It will be appreciated that there are a number of variations which may be made. The bearing surface may be formed by only one or more than two bands of bearing areas with one, two, three, four or more bearing areas and/or depressions in the or each row. The depressions need not be formed with side ramps; there may be comparatively sharp steps leading down into the depressions at the side edges. The depressions may be interconnected.

We claim:

1. A piston for reciprocation in an internal combustion engine and having a piston axis and comprising:
    a crown,
    means defining a gudgeon pin bore having an axis,
    a skirt extending on both sides of a plane, including the piston axis and the gudgeon pin bore axis,
    a plurality of bearing surfaces provided on said skirt on both sides of said plane, each of said plurality of bearing surfaces being surrounded by the associated skirt and extending radially outwardly thereof,
    at least one oil retaining depression provided in each of said plurality of bearing surfaces, each oil retaining depression being surrounded by the associated bearing surface,
    axially spaced circumferentially extending edges provided in each oil retaining depression,
    a step formed at each of said axially spaced circumferentially extending edges between the associated oil retaining depression and the surrounding bearing surface,
    a central base provided in each of said oil retaining depressions between each said step of the associated bearing surface,
    circumferentially extending ramps extending from each side of said central base to the surrounding bearing surface,
    circumferentially extending edges included on each of said plurality of bearing surface,
    a ramp provided between each said bearing surface edge and the skirt whereby lubricating oil on said skirt is forced into the oil retaining depressions in both directions of reciprocation of the piston and is retained in said oil retaining depressions by said steps with excess oil leaving said oil retaining depressions via said circumferentially extending ramps leading from said central bases.

2. A piston according to claim 1, wherein the maximum depth of the depression is less than 125 microns below the adjacent bearing surface.

3. (amended) A piston according to claim 1, wherein the depressions are arranged on each side of said skirt in at least two axially spaced rows.

4. (amended) A piston according to claim 3, wherein there are two rows with at least one depression in each row.

5. (amended) A piston according to claim 4, wherein the at least one depression in one row is circumferentially staggered relative to the at least one depression of the next adjacent row so that there is no or substantially no axial overlap between the at least one depression of said one row and the at least one depression of the next adjacent row.

6. (amended) A piston according to claim 1, wherein said plurality of bearing surfaces is provided by a single contiguous surface on each side of said plane including the piston axis and the gudgeon pin bore axis, with the at least one depression being providing in each such surface.

7. (amended) A piston according to, claim 1, wherein said plurality of bearing surfaces is provided by a plurality of discrete bearing areas on either side of said plane including the piston axis and the gudgeon pin bore axis, there being at least one depression in each said discrete area.

8. (amended) A piston according to claim 1, wherein the bearing surfaces includes generally axially extending edges between each of said plurality of bearing surfaces and said skirt, a ramp being provided between said edge and the skirt.

* * * * *